UNITED STATES PATENT OFFICE.

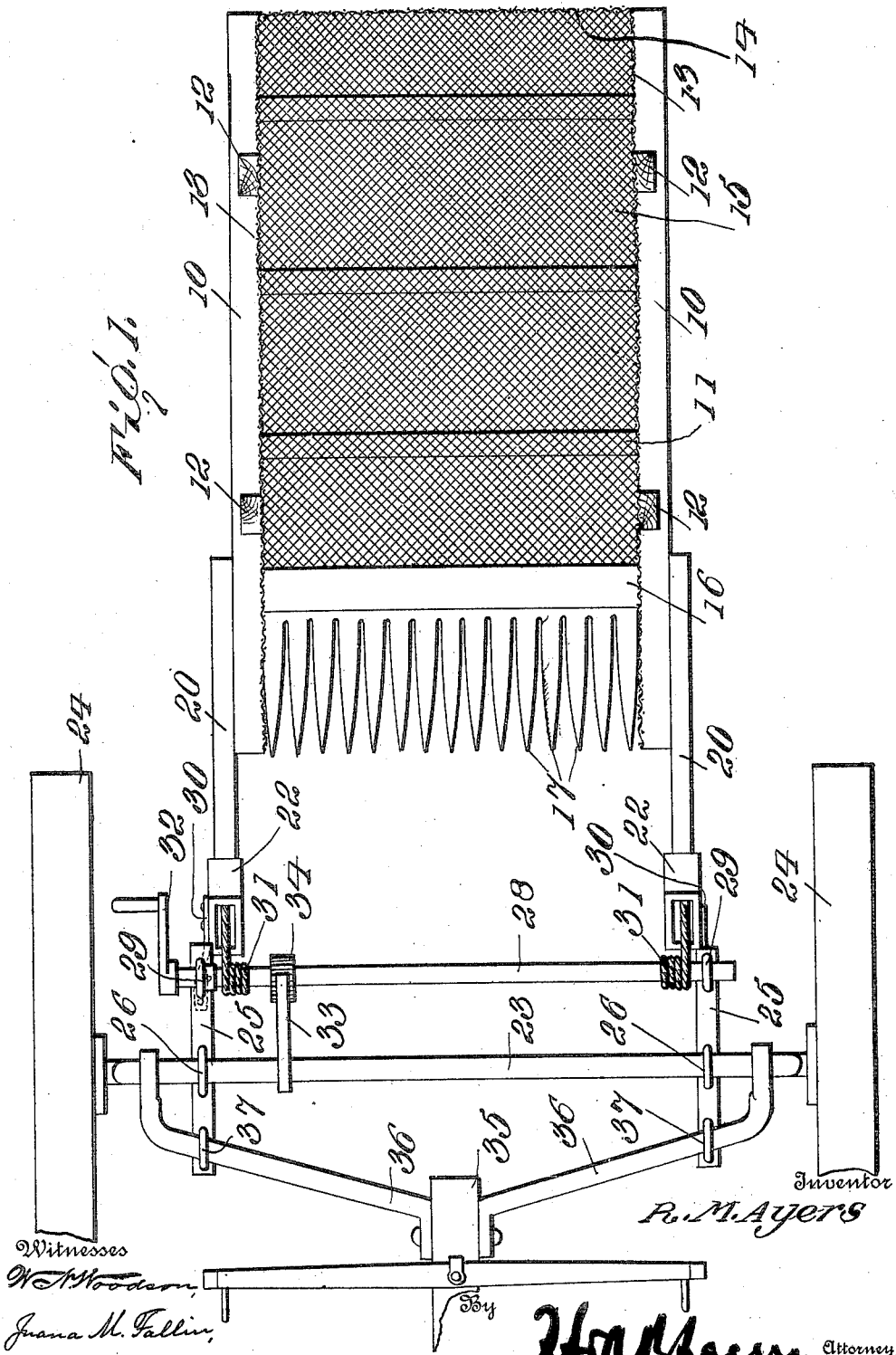

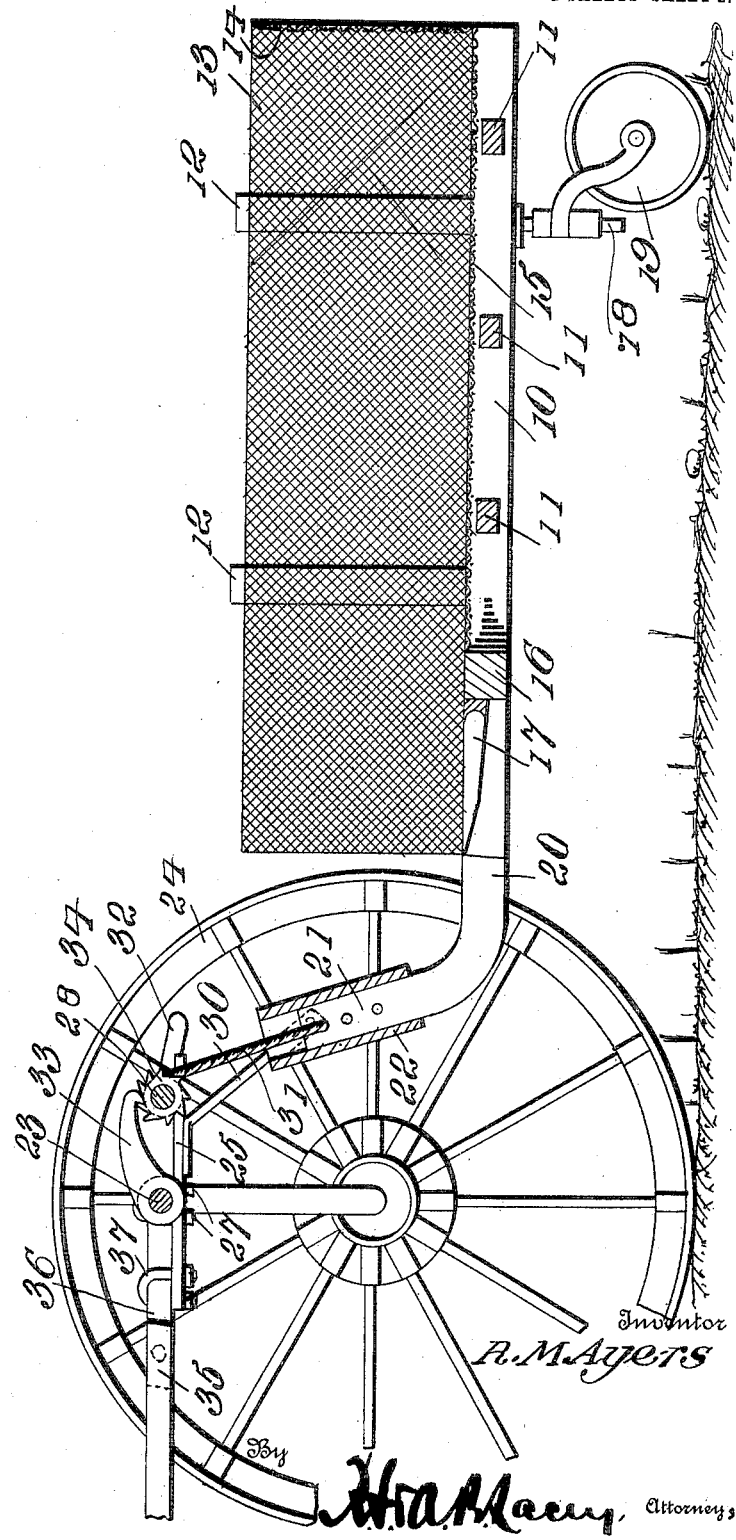

ROBERT M. AYERS, OF QUANAH, TEXAS.

COTTON-GATHERER.

971,513.  Specification of Letters Patent.  Patented Oct. 4, 1910.

Application filed March 29, 1910. Serial No. 552,172.

*To all whom it may concern:*

Be it known that I, ROBERT M. AYERS, a citizen of the United States, residing at Quanah, in the county of Hardeman and State of Texas, have invented certain new and useful Improvements in Cotton-Gatherers, of which the following is a specification.

This invention comprehends certain improvements in cotton gatherers of that type wherein the boll and the cotton are collected at the same time, and for subsequent separation.

An object of this invention is to construct a machine of this character adaptable for operation upon one row of the cotton at a time and to which two draft animals are attached so as to walk upon the opposite sides of the row.

The invention has for another object to provide a machine of this nature with an adjusting mechanism whereby the machine may be raised and lowered to accommodate the fingers to plants varying in height.

The invention further contemplates a cotton boll gatherer provided with a large basket or receptacle to receive the bolls as they are severed from the plants by the fingers of the machine, the bolls being forced backwardly into the basket by a rake or the like.

For a full understanding of the invention reference is to be had to the following description and accompanying drawings, in which:—

Figure 1 is a top plan view of the complete machine. Fig. 2 is a longitudinal section through the same.

Corresponding and like parts are referred to in the following description and indicated in all the views of the accompanying drawings by the same reference characters.

Referring to the drawings the body or frame of the machine comprises a pair of longitudinal beams 10 which are provided with transverse braces 11 arranged in spaced relation throughout the lengths of the beams. Adjacent the opposite ends of the beams 10, standards 12 are positioned which suitably support the sides 13 of the body. An end 14 is disposed across the rear extremities of the sides 13. The sides 13 and the end 14 are formed from wire-meshing and are joined at their lower edges with the edges of a bottom 15 which is likewise formed from wire-meshing.

The frame is provided at its forward end with a finger-bar 16 arranged between the longitudinal beams 10 and spaced inwardly from the forward ends thereof. The finger-bar 16 carries a plurality of spaced fingers 17 for engagement about the stems of the cotton plants. The throats between the fingers 17 are of such size that they receive the stems but prevent the passage of the cotton bolls therethrough. The longitudinal beams 10 are provided with depending rods 18 adjacent their rear extremities upon which caster wheels 19 are carried for supporting the rear end of the body.

A pair of arms 20 are forwardly extended from the beams 10 and are secured against the outer sides thereof, the arms 20 having up-turned portions 21 at their forward extremities to engage in suitable boxings or guides 22. The guides 22 snugly engage about the upturned portions 21 and admit of the vertical movement of the arms 20 therethrough.

An arched-bar 23 is positioned forwardly of the body and mounted upon suitable supporting wheels 24, the arched bar 23 carrying a pair of straps 25 through the medium of clips 26. The clips 26 are engaged over the upper portion of the arched-bar 23 adjacent its opposite ends and are secured through the straps 25 by means of clamping nuts 27. The straps 25 extend rearwardly from the arched-bar 23 and rotatably support a transverse shaft 28 through the medium of bearings 29. Depending straps 30 are secured against the under faces of the straps 25 and extend rearwardly therefrom for rigid engagement against the outer faces of the guides 22 in order to hold the guides in rigid relation relative to the arched-bar 23. The shaft 28 is provided with cables 31 about its opposite ends which extend into the guides 22 and are suitably secured to the upper ends of the up-turned portions 21. The shaft 28 carries a crank-arm 32 upon one end for winding the cables 31 thereabout. A pawl 33 is mounted upon the arched bar 23 adjacent one end thereof for coöperation with a ratchet 34 keyed to the shaft 28 for the purpose of locking the shaft in adjusted position. The arched-bar 23 is provided with a tongue 35 which is secured thereto through the medium of hounds 36, and which is employed for drawing the machine. The straps 25 extend forwardly from the arched-bar 23 and are secured to the hounds 36 through the medium of clips 37 for the purpose of retaining the straps 25 in a substantially horizontal plane.

In the operation of the device the shaft 28 is rotated to raise or lower the up-turned portions 21 through the medium of the cables 31. This adjustment is for the purpose of disposing the fingers 17 in approximate alinement with the cotton bolls on the plants which are to be operated upon. As the machine is drawn over the row of plants the stems are engaged in the throats of the fingers 17 and slide therethrough until the cotton boll strikes the upper faces of the fingers. The movement of the machine tears the boll from the stem and the boll is then drawn backwardly into the body by means of a rake or similar device. In this manner the bolls may be gathered from the plants as quickly as the machine can be conveniently drawn thereover.

Having thus described the invention what is claimed as new is:—

1. A cotton gatherer including an elongated body, caster wheels secured to the rear end of the body for supporting the same, spaced fingers located across the forward end of the body, a pair of up-turned arms projecting outwardly from said body, an arched-bar arranged in spaced relation across the forward end of the body, straps secured to said arched-bar, bearings carried by the rear ends of the straps, a transverse shaft journaled in the bearings, cables wound about said shaft and connected to the upper ends of said arms, depending straps carried by said first straps, guides secured to the lower ends of said depending straps and snugly engaging about the up-turned portions of said arms, and a tongue forwardly extending from said arched-bar.

2. A cotton gatherer including a body, gathering fingers carried by the body, caster wheels depending from the rear end of the body, upturned arms forwardly projecting from the body, an arched axle supported in spaced relation across the forward end of the body, guides carried by the axle to receive the upturned arms, a revoluble shaft carried by the arched axle above the guides, means for rotating said revoluble shaft, and connecting cables wound about the shaft and depending through the guides for attachment to the upper ends of said arms.

In testimony whereof I affix my signature in presence of two witnesses.

ROBERT M. AYERS. [L. S.]

Witnesses:
   John W. Poole,
   W. T. Perkins.